United States Patent
Taira et al.

(10) Patent No.: US 9,164,244 B2
(45) Date of Patent: Oct. 20, 2015

(54) OPTICAL CONNECTOR PLUG

(75) Inventors: Junji Taira, Chiba (JP); Norimasa Arai, Chiba (JP)

(73) Assignee: SEIKOH GIKEN Co., Ltd., Chiba (JP)

( * ) Notice: Subject to any disclaimer, the term of this patent is extended or adjusted under 35 U.S.C. 154(b) by 927 days.

(21) Appl. No.: 13/225,611

(22) Filed: Sep. 6, 2011

(65) Prior Publication Data

US 2012/0057830 A1 Mar. 8, 2012

(30) Foreign Application Priority Data

Sep. 6, 2010 (JP) .................................. 2010-198717
Aug. 4, 2011 (JP) .................................. 2011-170818

(51) Int. Cl.
*G02B 6/42* (2006.01)
*G02B 6/38* (2006.01)

(52) U.S. Cl.
CPC ............ *G02B 6/3849* (2013.01); *G02B 6/3825* (2013.01); *G02B 6/3893* (2013.01); *G02B 2006/4297* (2013.01)

(58) Field of Classification Search
None
See application file for complete search history.

(56) References Cited

U.S. PATENT DOCUMENTS

| 7,093,983 | B2 * | 8/2006 | Taira et al. | 385/78 |
| 7,153,035 | B2 * | 12/2006 | Taira et al. | 385/76 |
| 7,261,471 | B2 * | 8/2007 | Tsuchida et al. | 385/70 |
| 8,011,834 | B2 * | 9/2011 | Nakano et al. | 385/78 |

FOREIGN PATENT DOCUMENTS

| JP | 1667442 | 9/2005 |
| JP | 2005-292777 | 10/2005 |
| JP | 201514499 | 6/2010 |

* cited by examiner

*Primary Examiner* — Uyen Chau N Le
*Assistant Examiner* — John M Bedtelyon
(74) *Attorney, Agent, or Firm* — Clark & Body

(57) ABSTRACT

In an optical connector plug, a front end of the shutter member can move between a shield position to shield a front end face of a ferrule in an extension state and a non-shield position to expose the front end face of the ferrule to the front side of a housing in a reduction state, when a plug frame and a shutter holding member move between the extension state and the reduction state. In the optical connector plug, in a course in which the shutter holding member is engaged with holding portions protruding in an axial direction of the optical connector adaptor and a grip member moves from the extension state to the reduction state, the front end of the shutter member is spaced to face front ends of the holding portions in the axial direction.

10 Claims, 7 Drawing Sheets

FIG. 3
(a)
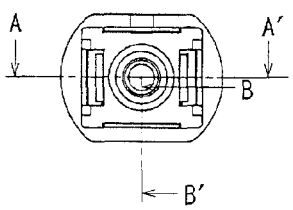
(b) A-A'
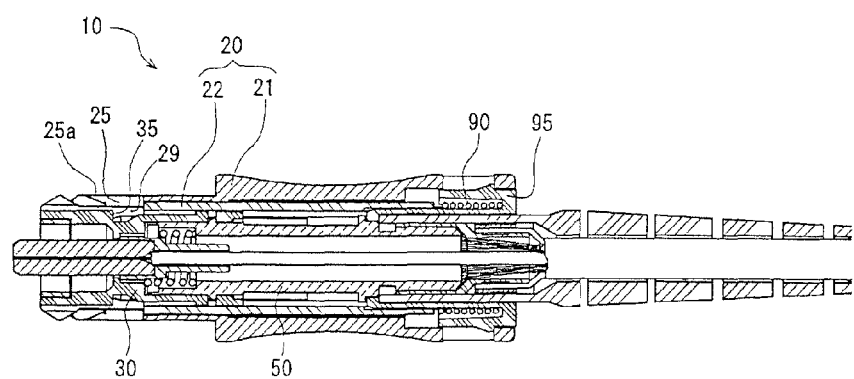
(c) B-B'
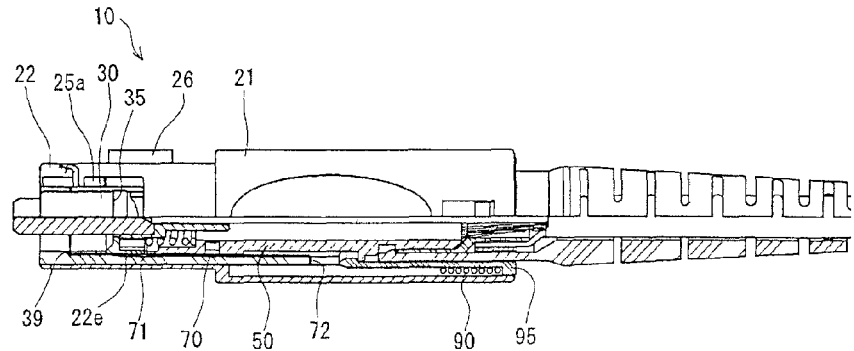

FIG. 7
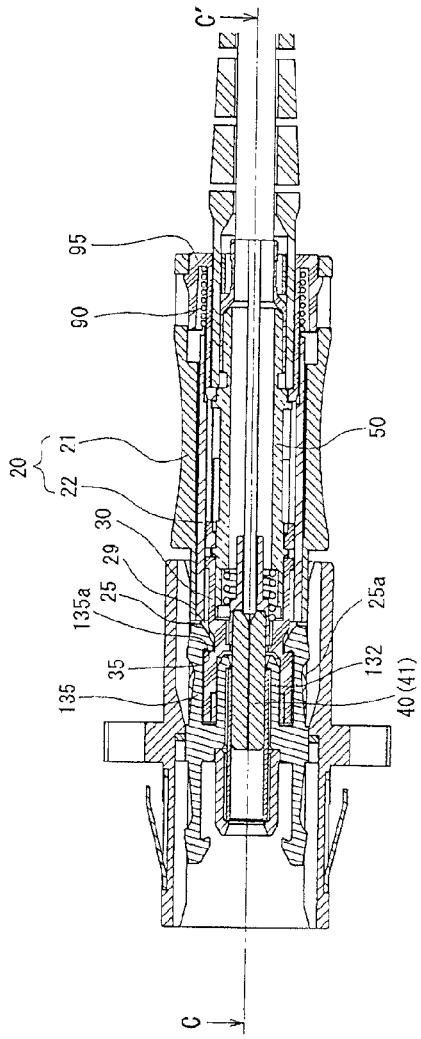
(a)
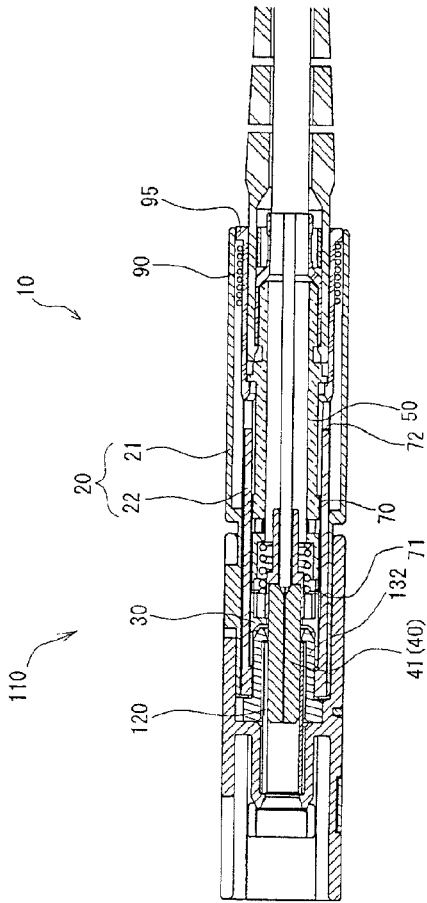
(b) C-C'

OPTICAL CONNECTOR PLUG

BACKGROUND OF THE INVENTION

1. Field of the Invention

The present invention relates to an optical connector plug that holds front ends of optical fibers and couples the optical fibers to each other.

2. Description of the Related Art

In the related art, optical coupling between optical fibers used for optical communication is performed using an optical connector. The optical connector includes optical connector plugs that hold front ends of optical fibers and an optical connector adapter that fix the optical connector plugs to each other and performs optical coupling of the optical fibers.

As the optical connector, an SC-type optical connector (complying with IEC 61754-4) that couples the optical fibers to each other using a ferrule barrel-shaped body (with the outer diameter of 2.5 mm) for holding the optical fibers or a miniaturized MU-type optical connector (complying with IEC 61754-6) using a ferrule barrel-shaped body (with the outer diameter of 1.25 mm) for holding the optical fibers is used.

In recent years, Fiber To The Home (FTTH) that establishes a high speed communication environment using access networks formed by using optical fibers and connecting subscriber lines from a telephone office to homes is spreading. In this optical fiber communication, an infrared ray with a wavelength of 1.3 μm to 1.55 μm is used as light for communication. Therefore, light output tends to increase.

However, if the high-output communication light is emitted from the front ends of the optical fibers and a human body, particularly, a part such as eyes, is exposed to the communication light, there is a high possibility of having a bad affect on the human body. In particular, a high safety is required for the optical connector plugs for holding the front ends of the optical fibers led into households according to the spread of the FTTH to the households.

From this requirement, a structure of an optical connector plug that incorporates a shutter to shield a front end face of the optical fiber is disclosed (for example, refer to Japanese Patent Application Laid-Open (JP-A) No. 2005-292777 (page 22, FIG. 26)). The optical connector plug that incorporates the shutter is inserted into an optical connector adapter 110, the shutter is opened, and the front end of the optical fiber is exposed, and the optical connector plug is coupled to the optical connector adapter 110.

In the optical connector plug that is disclosed in JP-A No. 2005-292777, an inner barrel (shutter holding member) contacts a coupling claw of the optical connector adapter, is pressed, and changes from an extension state to a reduction state. At this time, a shielding plate (shutter member) is pushed down by a moving plug frame, a front end face of a ferrule is exposed, and the optical connector plug is coupled to the optical connector adapter.

However, although the coupling claw of the optical connector adapter originally pushes the inner barrel (shutter holding member), deformation may be caused due to the pushing force, and the inner barrel (shutter holding member) may push the coupling claw and move to a center portion of the optical connector adapter.

This is caused when the elastic force of the coupling claw of the optical connector adapter is weak, when an interval of the facing coupling claws is more than a defined value, or when the optical connector plug is erroneously inserted with the inner barrel (shutter holding member).

As such, if the inner barrel (shutter holding member) moves to the center portion of the optical connector adapter, the shielding plate (shutter member) is interposed between the ferrule and a sleeve holding member of the optical connector adapter. In this state, if the optical connector plug is strongly inserted, the shielding plate (shutter member) is deformed or the shielding plate is damaged.

Even when a shape corresponding to the coupling claw of the optical connector adapter does not exist like when the optical connector plug is connected to a measurer such as an optical power measurer and a ferrule end face shape measurer or a ferrule end face cleaning tool is used, the shielding plate (shutter member) may be damaged.

SUMMARY OF THE INVENTION

According to an aspect of the present invention, an optical connector plug of a push-on coupling system includes a plug frame that holds a ferrule having at least one optical fiber extending in an axial direction and a housing that holds the plug frame therein. The housing includes a grip member and a shutter holding member that move relatively in an axial direction, the shutter holding member includes a shutter member that has a front end positioned at the front side of the axial direction and a base end positioned at the rear side of the axial direction and held in the shutter holding member, the plug frame moves relatively in the axial direction with respect to the shutter holding member while synchronizing with the grip member in a state in which a predetermined movement amount in the axial direction is allowed, having an extension state in which the grip member moves to the rear side of the axial direction of the shutter holding member and a reduction state in which the grip member moves to the front side of the axial direction of the shutter holding member, the housing has a shape to be coupled to the optical connector adapter in the reduction state, and a coupling recess portion that is provided on the outer circumference of the front end side of the plug frame to be coupled to a coupling claw of the optical connector adapter.

In the optical connector plug according to the aspect of the present invention, the front end of the shutter member moves between a shield position to shield a front end face of the ferrule in the extension state and a non-shield position to expose the front end face of the ferrule to the front side of the housing in the reduction state, when the plug frame and the shutter holding member move between the extension state and the reduction state. In the optical connector plug, in the course in which the shutter holding member is inserted with the holding portions protruding in the axial direction of the optical connector adapter and the grip member moves from the extension state to the reduction state, the front end of the shutter member maintains spaced to face front ends of the holding portions in the axial direction.

In the optical connector plug according to the aspect of the present invention, in the shutter member, the base end is held at the rear side of the axial direction of the shutter holding member and the front end is positioned at the center of the axial direction of the shutter holding member.

In the optical connector plug according to the aspect of the present invention, the front end of the shutter member is positioned to be closer to the rear side of the axial direction than the coupling recess portion of the plug frame, in the reduction state.

In the optical connector plug according to the aspect of the present invention, the shutter member is formed of a plate spring.

In the optical connector plug according to the aspect of the present invention, the shutter holding member is provided with a shutter biasing member to bias the shutter member, to dispose the front end of the shutter member at the shield position in the extension state.

In the optical connector plug according to the aspect of the present invention, the optical connector plug has a shape that is coupled to an SC-type optical connector adaptor, in the reduction state.

In the optical connector plug according to the aspect of the present invention, even though the shutter holding member passes through the coupling claw of the optical connector adaptor and moves to the center portion of the optical connector adaptor, the shutter member does not interfere with the sleeve holding portion. For this reason, an optical connector plug where the shutter member is not deformed and damaged can be provided.

BRIEF DESCRIPTION OF THE DRAWINGS

FIGS. 3A to 3C are a front view and cross-sectional views of a main part of the optical connector plug according to the embodiment of the present invention;

FIGS. 7A and 7B are cross-sectional views illustrating a coupling operation between the optical connector plug and the optical connector adapter according to the embodiment of the present invention.

DESCRIPTION OF THE PREFERRED EMBODIMENTS

Figure 1:
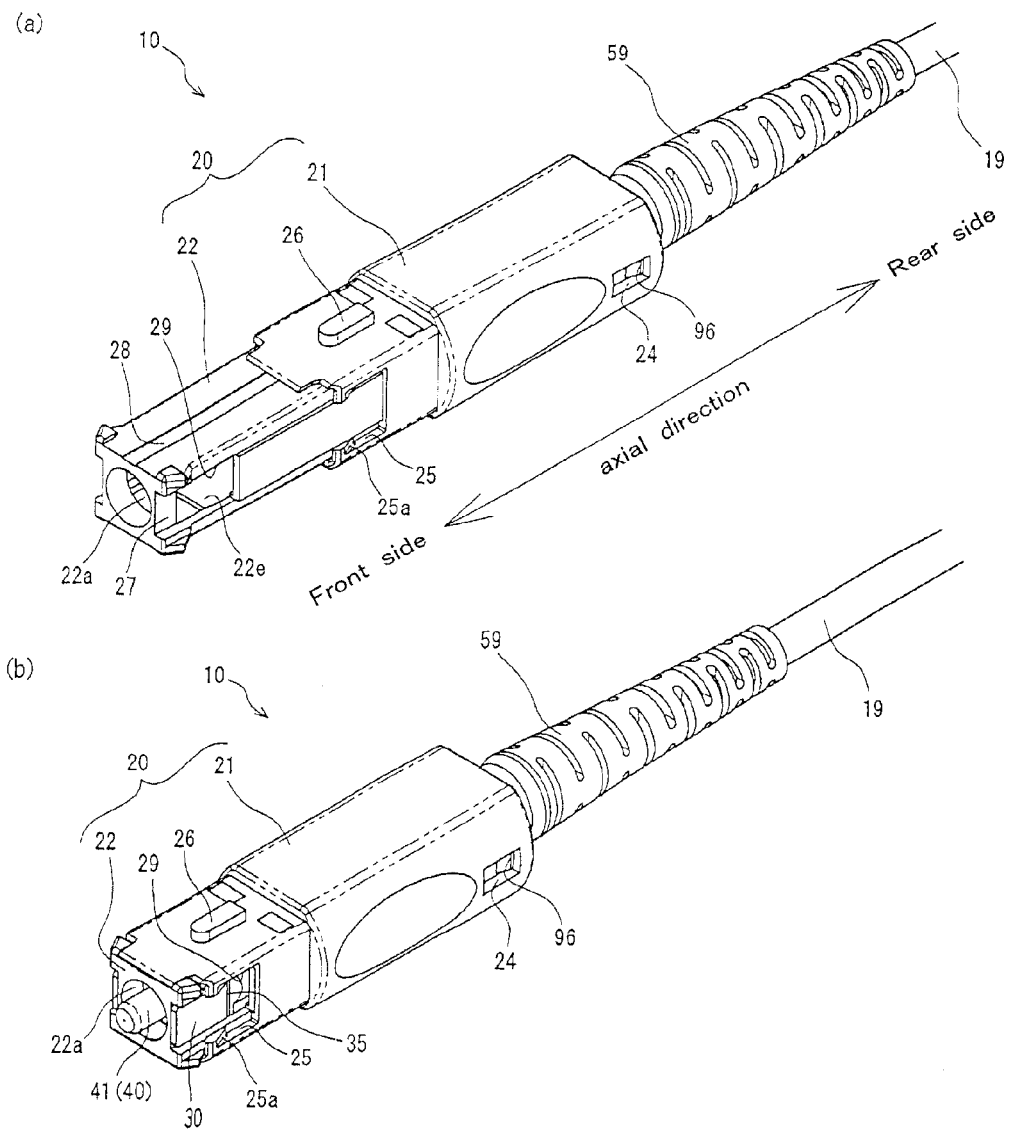
FIGS. 1A and 1B are perspective views of an optical connector plug according to an embodiment of the present invention.
Figure 4:
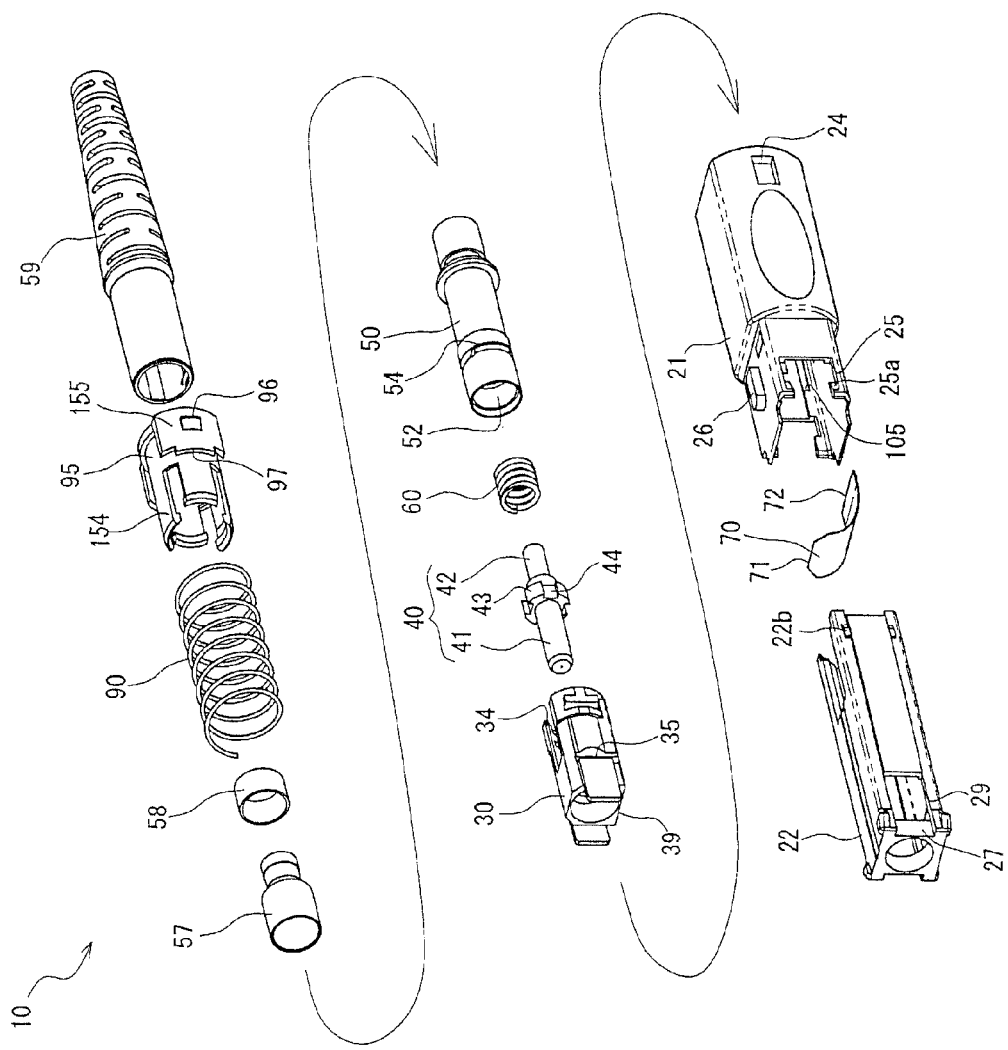
FIG. 4 is an exploded perspective view of the optical connector plug according to the embodiment of the present invention.

Hereinafter, the present invention will be described in detail on the basis of an embodiment.
[First Embodiment]
FIGS. 1A and 1B are perspective views of an optical connector plug 10 according to an embodiment of the present invention and FIGS. 2A to 3C are front views, cross-sectional views taken along the line A-A', and cross-sectional views taken along the line B-B' of the optical connector plug 10. FIG. 4 is an exploded perspective view of the optical connector plug 10.

As illustrated in FIGS. 1A to 4, the optical connector plug 10 according to this embodiment has a shape in which the optical connector plug 10 can be coupled to an SC-type optical connector adaptor to be described below. The optical connector plug 10 includes a housing 20, a plug frame 30 that is held movably in an axial direction (toward the front side and the rear side of an axial direction) in the housing 20, a ferrule 40 that holds an optical fiber 15 for optical coupling and is inserted from the rear of the plug frame 30, a stop ring 50 that has a front end engaged with a rear end of the plug frame 30, and a biasing spring 60 that is held between the ferrule 40 and the stop ring 50 for biasing the ferrule 40 toward the front of the axial direction.

As illustrated in FIGS. 2A to 2C, the ferrule 40 includes a ferrule barrel-shaped body 41 that has the outer diameter of 2.499 mm and a collar member 42 that is fitted into one end of the ferrule barrel-shaped body 41.

The ferrule barrel-shaped body 41 has a substantially cylindrical shape. In an inner portion of the ferrule barrel-shaped body 41, insertion hole 41a that is formed to be penetrated in the axial direction and holds the optical fiber 15 inserted therein is provided. At the rear end of the optical fiber insertion hole 41a, a tapered portion 41b of which the inner diameter increases gradually toward an opening side is provided. By providing the tapered portion 41b, the tapered portion 41b prevents the front end of the optical fiber 15 from being chipped or bent due to the contact of the front end of the optical fiber 15 with an end face of the ferrule barrel-shaped body 41, when the optical fiber 15 is inserted into the optical fiber insertion hole 41a.

The ferrule barrel-shaped body 41 may be made of a ceramic material such as zirconia, a plastic material, and a glass material such as crystallized glass, borosilicate glass, and quartz. In this embodiment, the ferrule barrel-shaped body 41 is made of zirconia and the outer diameter of the ferrule barrel-shaped body 41 is 2.499 mm.

In addition, in the collar member 42 that is fitted into the rear end of the ferrule barrel-shaped body 41, an optical fiber core wire insertion hole 42a that holds an optical fiber core wire 16, which is coated on the outer circumference of the optical fiber 15 along the axial direction, inserted therein, and a collar portion 43 that protrudes by a predetermined amount in a radius direction along a circumferential direction of the outer circumference are provided.

As illustrated in FIG. 4, on the outer circumference of the collar portion 43, key grooves 44 are provided in two or four places at an interval of 90 degrees in the circumferential direction. The key grooves 44 have the same width along the axial direction. As the key grooves 44 are engaged with a key groove protruding portion 32a of the plug frame 30, movement of the ferrule 40 in a rotating direction with an axis centered with respect to the plug frame 30 is regulated.

The number, position, depth and shape of the key grooves 44 are not particularly limited and may be appropriately set according to the plug frame 30 to position the ferrule 40.

In addition, a material of the collar member 42 is not particularly limited and may include a metal material such as stainless steel, brass, or iron, or a resin material such as plastic. In this embodiment, the collar member 42 is made of the stainless steel.

As illustrated in FIGS. 2A to 2C, the plug frame 30 has a shape of a hollow rectangular pillar shape. In the plug frame 30, the ferrule 40 that is penetrated along the axial direction and a ferrule insertion hole 31 that can insert the spring 60 therein are provided. In the ferrule insertion hole 31, a ferrule protruding hole 32 is provided to protrude only the front end of the ferrule barrel-shaped body 41. The ferrule protruding hole 32 has the outer diameter that is larger than that of the ferrule barrel-shaped body 41 and the inner diameter that is smaller than that of the collar portion 43.

In the ferrule insertion hole 31, the two key groove protruding portions 32a that are engaged with the key grooves 44 of the ferrule 40 are provided to protrude to the inner side of the radius direction. As the key groove protruding portion 32a are engaged with the key grooves 44 of the ferrule 40, movement of the ferrule 40 in a rotating direction with an axis centered with respect to the plug frame 30 is regulated and the ferrule 40 is held to be movable in the axial direction.

As illustrated in FIGS. 2B and 2C, engagement holes 33 that are opened to the outer circumference in communication with the ferrule insertion hole 31 are provided on two facing surfaces of the outer circumference of the plug frame 30, respectively. As an engagement protrusion portion 54 provided on the outer circumference of the stop ring 50 is engaged with the engagement holes 33, the plug frame 30 is engaged with the stop ring 50.

In addition, on the two facing surfaces crossing a surface in which the engagement holes 33 of the plug frame 30 are provided, a cut portion 34 that is cut by a predetermined length toward the axial direction from the rear end is provided, as illustrated in FIG. 4. The cut portion 34 facilitates elastic deformation of the plug frame 30 to open the plug frame 30 outward, when the stop ring 50 is engaged with the rear end of the plug frame 30.

In addition, a pair of coupling recess portions 35 that are recessed from an outer surface of the plug frame 30 to the inner side of the radial direction are provided at the centers of the two facing surfaces of the outer circumference of the plug frame 30 in the axial direction, respectively. The coupling recess portions 35 of the plug frame 30 are coupled to a locking claw 135a provided on a front end of a coupling claw 135 of the optical connector adapter 110 to couple the optical connector adapter 110 and the optical connector plug 10.

As illustrated in FIGS. 2A to 2C, the stop ring 50 that is engaged with the rear end of the plug frame 30 has a cylindrical shape that is made of a metal material or a resin material such as plastic, and has an optical fiber core wire insertion hole 51 into which the optical fiber core wire can be inserted. A communication hole 52 into which the spring 60 can be inserted is provided at the side of a front end of the optical fiber core wire insertion hole 51. A stepped portion 53 that is formed by the difference of the inner diameters between the optical fiber core wire insertion hole 51 and the communication hole 52 is provided.

The spring 60 is held in the communication hole 52 and the side of the rear end of the collar member 42 of the ferrule 40 is inserted into the held spring 60. One end of the spring 60 contacts a rear end face of the collar portion 43 and the other end contacts the stepped portion 53 of the stop ring 50. As a result, the ferrule 40 is held in a state in which the ferrule 40 is biased forward with respect to the plug frame 30. At this time, the ferrule 40 is biased and held in a state in which the front end face of the collar portion 43 contacts a ferrule protrusion portion hole 32 and the forward movement is regulated.

As described above, as the key groove 44 of the collar portion 43 of the ferrule 40 is engaged with the key groove protruding portion 32a of the ferrule insertion hole 31, the movement of the ferrule 40 in the rotating direction around the axis is regulated and the ferrule 40 is held to be movable in the axial direction. For this reason, the ferrule 40 is biased and held to be movable toward the rear side, in a state in which the movement of the ferrule 40 in the rotating direction with respect to the plug frame 30 is regulated.

On the outer circumference of the front side of the stop ring 50, two engagement protrusion portions 54 that protrude into the engagement hole 33 of the plug frame 30 are provided at facing positions. The engagement protrusion portions 54 have outer circumferential surfaces having a shape of a taper where its outer diameter decreases gradually toward its front end. The engagement protrusion portions 54 are engaged with the engagement hole 33 of the plug frame 30 while pushing the rear end of the plug frame 30 to the outside, when the stop ring 50 is inserted from the rear side of the plug frame 30.

To the side of the rear end of the stop ring 50, a caulking ring 57 is fixed. The caulking ring 57 is pressed and fixed to the rear end of the stop ring 50, in a state in which a tension member 17 of an optical fiber cord 19 is interposed between the stop ring 50 and the caulking ring 57. The tension member 17 is disposed in an internal space of an outer cover 18, on the outer circumference of the coated optical fiber core wire 16 coated on the outer circumference of the optical fiber 15.

To the rear end of the caulking ring 57, a ring 58 is fixed. The ring 58 is pressed and fixed to the rear end of the caulking ring 57, in a state in which the outer cover 18 of the optical fiber cord 19 is interposed between the caulking ring 57 and the ring 58. The optical fiber cord 19 is fixed to the optical connector plug 10, by the stop ring 50, the caulking ring 57, and the ring 58.

In addition, a boot 59 that includes the caulking ring 57 and the ring 58 inside is fitted into the rear side of the stop ring 50. The optical fiber cord 19 is inserted into the boot 59. The boot 59 is formed of an elastic material such as rubber or elastomer or a resin material such as plastic.

Figure 2:
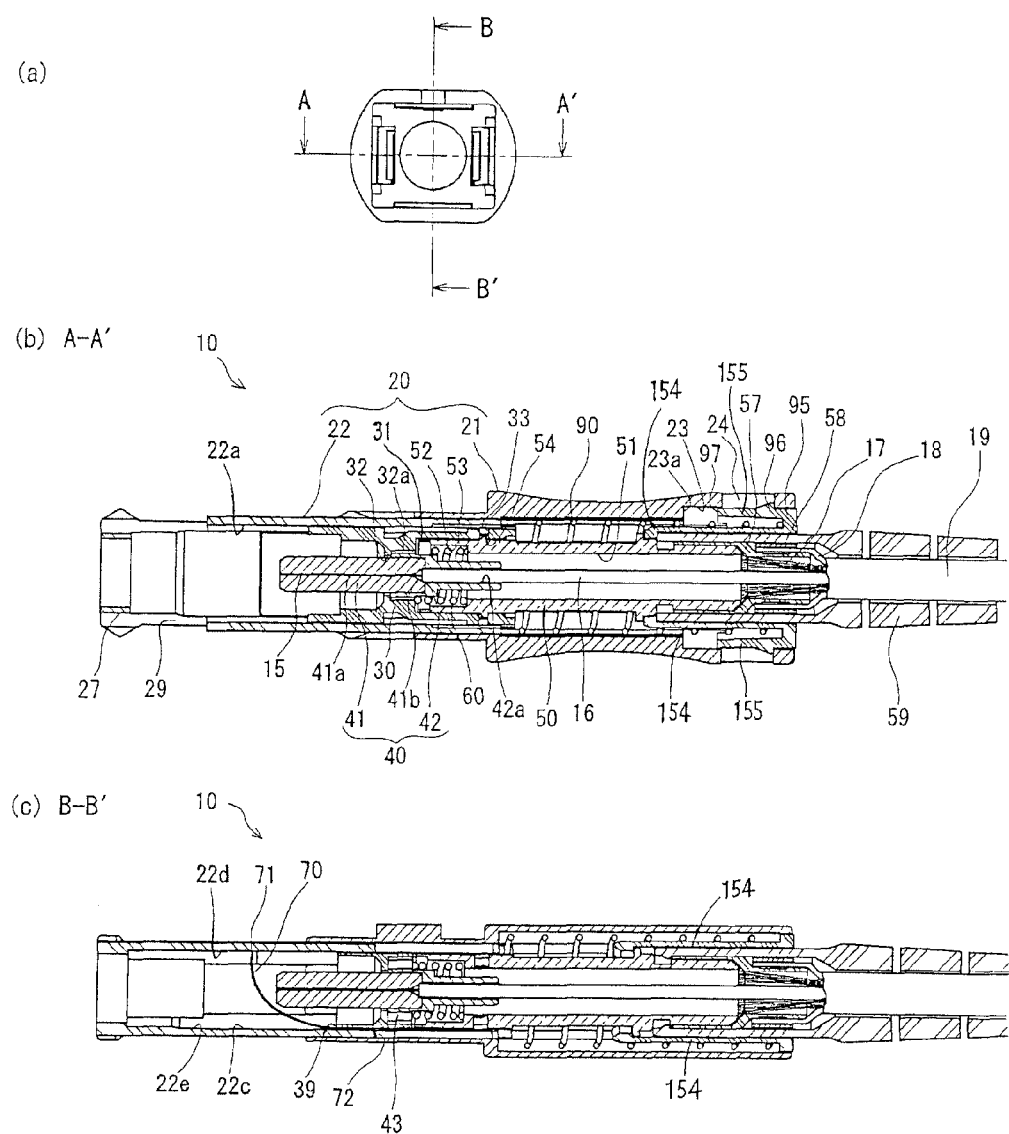
FIGS. 2A to 2C are a front view and cross-sectional views of a main part of the optical connector plug according to the embodiment of the present invention.

Meanwhile, as illustrated in FIGS. 2A to 3C, the housing 20 includes a grip member 21 that has a shape of a hollow rectangular pillar and a shutter holding member 22 that has a shape of a hollow rectangular pillar and is accommodated to be movable to the front and rear sides of the axial direction in the grip member 21. The housing 20 has a reduction state in which the shutter holding member 22 is accommodated in the grip member 21, as illustrated in FIG. 3A to 3C, and an extension state in which the shutter holding member 22 protrudes to the front side, as illustrated in FIGS. 2A to 2C.

As illustrated in FIGS. 2A to 3C, a holding hole 23 that holds a biasing member receiving member 95 therein is provided in the grip member 21. The biasing member receiving member 95 is engaged with and held in the holding hole 23 to move by the predetermined amount with respect to the grip member 21. More specifically, an engagement window 24 that engages with an engagement convex portion 96 provided on the outer circumference of the biasing member receiving member 95 is provided at the rear end side of the holding hole 23. A rear surface of the engagement convex portion 96 of the biasing member receiving member 95 contacts a rear surface of the engagement window 24 and movement of the biasing member receiving member 95 to the rear side is regulated. In addition, a contact surface 97 of the biasing member receiving member 95 contacts a contact step 23a that is an inner surface of the holding hole 23 and movement of the biasing member receiving member 95 to the front side is regulated. The biasing member receiving member 95 is connected to the plug frame 30 through the stop ring 50. The front and rear movement amounts that are allowed by the plug frame 30 with respect to the grip member 21 are equal to the front and rear movement amounts that are allowed by the biasing member receiving member 95 with respect to the grip member 21.

The biasing member receiving member 95 has a first biasing member holding portion 154 of an approximately cylindrical shape that has the predetermined length and extends in the axial direction and a second biasing member holding portion 155 that is positioned at the outside of a circumferential direction of the first biasing member holding portion 154 and extends in the axial direction. In the biasing member receiving member 95, the first biasing member holding portion 154 and the second biasing member holding portion 155 are inserted into the holding hole 23 of the grip member 21. A front end of the boot 59 is inserted into the first biasing member holding portion 154 to be removable.

As illustrated in FIGS. 2A to 3C, a biasing member 90 is provided between the biasing member receiving member 95 and the shutter holding member 22 in the grip member 21. The biasing member 90 biases the shutter holding member 22 in a direction pushing the shutter holding member 22 to the front side. The biasing member 90 is composed of a coil spring that is made of a metal material such as stainless steel or piano wire and extends in the axial direction. In this embodiment, the coil spring that is made of the stainless steel is used. The spring force that pushes the shutter holding member 22 to the front side by the biasing member 90 is suppressed to the magnitude not disturbing insertion of the optical connector plug 10 into the optical connector adaptor 110 and has the magnitude that is sufficient to securely push the shutter holding member 22 to make the housing 20 become an extension state. Specifically, the spring force has the magnitude in a range of 0.5 to 4 N.

The coil spring that is the biasing member 90 is positioned at the outer side of an outer circumferential surface of the first biasing member holding portion 154 of the biasing member receiving member 95 and is positioned at the inner side of an inner circumferential surface of the second biasing member holding portion 155. That is, the coil spring is supported to the biasing member receiving member 95, in a state in which the coil spring is interposed between the first biasing member holding portion 154 and the second biasing member holding portion 155. Thereby, inadvertent falling of the coil spring from the holding hole 23 of the grip member 21 can be prevented. The inner diameter of the coil spring that is the biasing member 90 is slightly larger than the outer diameter of the first biasing member holding portion 154.

The biasing member 90 and the biasing member receiving member 95 have the inner diameters that are larger than the outer diameters of the caulking ring 57 and the optical fiber cord 19. The biasing member 90 and the biasing member receiving member 95 are disposed on the outer circumference of the caulking ring 57 to overlap each other. In this embodiment, the biasing member 90 is configured using a coil spring that has the coil inner diameter equal to φ7.0 or more and equal to φ7.4 or less.

Thereby, when the optical connector plug 10 is assembled, after pressing and fixing the caulking ring 57 to the rear end side of the stop ring 50 with the tension member 17 of the optical fiber cord 19 therebetween, the biasing member 90 and the biasing member receiving member 95 passing through the upper side of the optical fiber cord 19 of the rear side are moved to the front side, the biasing member receiving member 95 is connected to the stop ring 50, and the biasing member receiving member 95 is engaged with the grip member 21.

As illustrated in FIGS. 3B and 4, in a region of the grip member 21 that faces the coupling recess portions 35 of the plug frame 30, a first exposure hole 25 that exposes the coupling recess portion 35 to the outside is provided. In addition, a coupling releasing portion 25a that is inclined toward the rear end side of the grip member 21 is provided on a side of a surface on which the first exposure hole 25 is opened to the outside. The coupling releasing portion 25a releases coupling of the coupling claw 135 and the coupling recess portion 35 as the coupling claw 135 is pressed according to the movement of the grip member 21 to the rear side by drawing out the grip member 21, under a state in which the coupling claw 135 of the optical connector plug 110 is coupled to the coupling recess portion 35 of the plug frame 30.

As illustrated in FIGS. 1A and 1B and 2B, a key 26 that protrudes to position the optical connector plug 10 in the rotating direction around an axis with respect to the optical connector adapter 110 when the optical connector plug 10 is coupled to the optical connector adapter 110 is provided on the outer circumference of one side of an facing surface in which the first exposure hole 25 of the grip member 21 is not provided. On a surface of the same direction as the key 26 of the grip member 21 on the outer circumference of the shutter holding member 22, a display portion 28 is provided to easily recognize the same direction as the surface where the key 26 is provided.

As illustrated in FIGS. 2A to 2C and 4, in the shutter holding member 22 that is provided to be movable to the front and rear sides of the axial direction in the grip member 21, an insertion hole 22a where the plug frame 30 is moved to the front and rear sides along the axial direction is provided. On an outer circumferential surface of the rear end side of the shutter holding member 22, a protruded disengagement prevention protrusion portion 22b is provided. The disengagement prevention protrusion portion 22b contacts a stepped portion 105 provided on an inner surface of the grip member 21 and movement of the disengagement prevention protrusion portion 22b in a disengagement direction is regulated. The disengagement prevention protrusion portion 22b is formed in a tapered shape in which the thickness decreases toward the rear side of the shutter holding member 22. When the grip member 21 and the shutter holding member 22 are assembled, the disengagement prevention protrusion portion 22b is accommodated beyond the stepped portion 105 of the grip member 21 by inserting the shutter holding member 22 into the grip member 21. Accordingly, the shutter holding member 22 is prevented from being disengaged from the grip member 21.

The amount of movement of the plug frame 30 with respect to the grip member 21 is not particularly limited as long as the optical connector plug 10 can be disengaged from the optical connector adapter 110. For example, in the case of using the SC-type optical connector adapter 110, the plug frame 30 may be moved by about 2 mm in the axial direction (anteroposterior direction) with respect to the grip member 21.

A second exposure hole 29 that exposes the coupling recess portion 35 of the plug frame 30 to the outside in communication with the first exposure hole 25 of the grip member 21 when the housing 20 is in a reduction state is provided at the front end side of the shutter holding member 22. That is, the housing 20 is coupled to the coupling claw 135 of the optical connector adapter 110 as the coupling recess portion 35 of the plug frame 30 is exposed by the first and second exposure holes 25 and 29 in the reduction state in which the shutter holding member 22 is accommodated in the grip member 21.

On the front end side of the shutter holding member 22, a coupling claw passing portion 27 through which the coupling claw 135 of the optical connector plug 110 can pass without no catch is formed. Thereby, when the optical connector plug 10 is inserted into the optical connector adaptor 110, the shutter holding member 22 can be moved to a center portion of the optical connector adaptor 110 without contacting the coupling claw 135.

In the shutter holding member 22, a shutter member 70 that is held to be inclined and deformed through a base end 72 on one surface 22c of the insertion hole 22a is provided.

The shutter member 70 is formed of a plate member that almost entirely closes the insertion hole 22a. The base end 72 of the shutter member 70 is held on one surface 22c that is one of the two facing surfaces where the second exposure hole 29 is not provided. A front end 71 of the shutter member 70 is provided to be inclined or deformed toward the other surface 22d opposite to one surface 22c where the base end 72 is held.

The front end 71 of the shutter member 70 is provided to be positioned closer to the front side of the housing 20 than the base end 72, when the front end 71 moves to one surface 22c where the base end 72 is held. The shutter member 70 has the length where the front end 71 contacts the other surface 22d at a predetermined inclination angle, when the front end 71 is inclined and deformed toward the side of the other surface 22d.

The shutter member 70 closes the insertion hole 22a as the front end 71 thereof contacts the other surface 22d of the insertion hole 22a. As the front end 71 of the shutter member 70 moves to one surface 22c, the shutter member 70 allows the movement of the plug frame 30 and exposes a front end face of the ferrule 40 to the front side. The shutter member 70 is inclined and deformed between a shield position to shield the front end face of the ferrule 40 and a non-shield position to expose the front end face of the ferrule 40 to the front side.

The shutter member 70 is provided not to interfere with the ferrule 40 and the plug frame 30 at the shield position. The shutter member 70 is provided such that the shutter member 70 contacts members such as a first holding portion 132 (holding portion), a second holding portion 145 (holding portion), and the coupling claw 135 of the optical connector adaptor 110 described below and is not deformed and destroyed, when the optical connector plug 10 is connected to the optical connector adaptor 110.

As illustrated in FIGS. 3A to 3C, at the non-shield position that is coupled to the optical connector adaptor 110, the front end 71 of the shutter member 70 is positioned to be closer to the rear side of the axial direction than the coupling recess portion 35 of the plug frame 30. This is because the first holding portion 132 or the second holding portion 145 of the optical connector adaptor 110 is positioned to be closer to the center side of the optical connector 110 (front side of the axial direction of the optical connector plug 10) than the locking claw 135a of the coupling claw 135.

Therefore, even though the shutter member 70 is inclined and deformed between the shield position and the non-shield position in a state in which the shutter holding member 22 moves to the center portion of the optical connector plug 110, the shutter member 70 is not deformed or destroyed.

A material of the shutter member 70 is not particularly limited as long as it has durability. For example, the material may include a metal material such as stainless steel. In this embodiment, as the shutter member 70, the stainless steel that has spring elasticity is used. In this embodiment, when the plug frame 30 moves to the rear side of the axial direction and the housing 20 becomes an extension state, the front end 71 is biased to the side of the other surface 22d by the spring elasticity of the shutter member 70 and is moved to the shield position.

The shutter member 70 may include a unit that shields the front end face of the ferrule 40 and a unit that biases the front end 71 to the side of the other surface 22d. For example, the shutter member 70 includes a shutter plate where the base end 72 is held on one surface 22c to be inclined and rotated and the front end 71 is inclined to contact the other surface 22d and a torsion spring that is provided on one surface 22c and biases the front end 71 of the shutter plate 70 to the other surface 22d.

In this embodiment, an accommodating portion 22e that accommodates the shutter member 70 is provided on one surface 22c of the insertion hole 22a of the shutter holding member 22, such that the shutter member 70 does not regulate the movement of the plug frame 30 in contact with the plug frame 30 when the shutter member 70 moves to the non-shield position.

As illustrated in FIGS. 2A to 2C, in the optical connector plug 10 that has the above configuration, the housing 20 becomes an extension state and the shutter member 70 is inclined and deformed to the shield position. Thereby, the shutter member 70 shields the front end face of the ferrule 40 such that light is not emitted from the front end of the optical connector plug 10.

As illustrated in FIGS. 3A to 3C, by making the housing 20 become the reduction state, a front end frame portion 39 of the plug frame 30 lays the shutter member 70 and the shutter member 70 is accommodated in the accommodating portion 22e and is inclined and deformed to the non-shield position. Thereby, the shutter member 70 does not shield the front end face of the ferrule 40 and the optical fibers 15 are optically coupled. The extension state and the reduction state of the housing 20 can be changed by grasping the grip member 21 and attaching/detaching it to/from the optical connector adapter 110.

Figure 5:
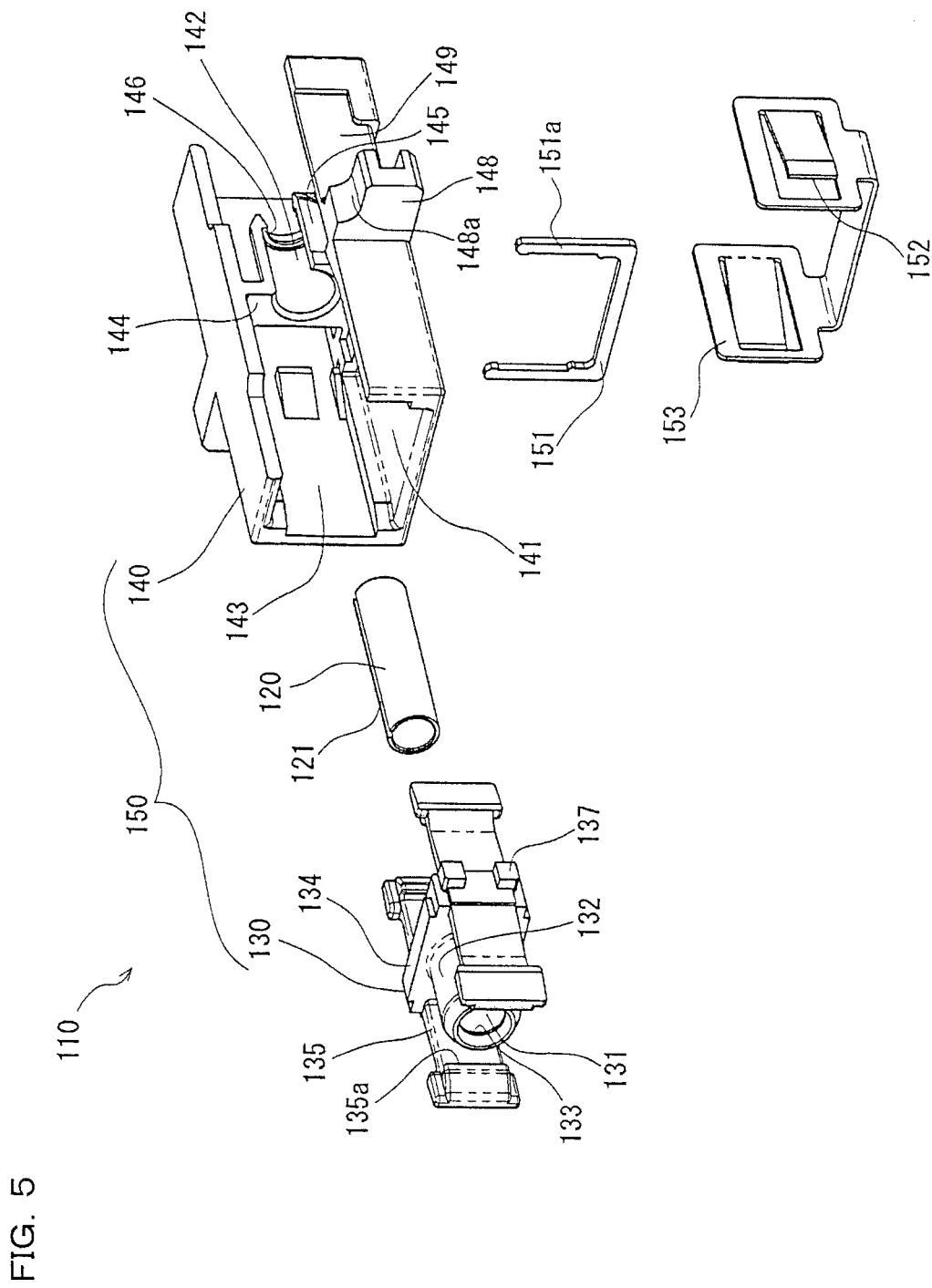
FIG. 5 is an exploded perspective view of a cut part of an optical connector adapter according to the embodiment of the present invention.

Here, the optical connector adapter 110 to which the optical connector plug 10 according to this embodiment is coupled will be described. FIG. 5 is an exploded perspective view of a cut portion of the optical connector adapter 110.

As illustrated in FIG. 5, the optical connector adapter 110 to which the optical connector plug 10 is coupled is of an SC type and has an optical coupling sleeve 120 and a holding member 150. The holding member 150 includes a sleeve holder 130 and an outer member 140 that interpose the optical coupling sleeve 120 therebetween.

The optical coupling sleeve 120 has a cylindrical shape, is formed of metal or ceramic, and is provided with a slit 121 penetrated along the axial direction. The optical coupling sleeve 120 has the inner diameter slightly smaller than the outer diameter of the ferrule barrel-shaped body 41 of the optical connector plug 10 for holding the optical fiber. The optical coupling sleeve 120 closely adheres and holds the ferrule barrel-shaped body 41 to an inner surface of the optical coupling sleeve 120 in a facing and coupling state by elastic deformation by the slit 121. In this embodiment, since the ferrule barrel-shaped body 41 has the outer diameter of 2.499 mm, the optical coupling sleeve 120 has the inner diameter of $\phi$2.495 mm and the outer diameter of $\phi$3.0 to 3.2 mm.

The sleeve holder 130 of the holding member 150 that holds the optical coupling sleeve 120 has a first holding portion 132 of a cylindrical shape that has a first through-hole 131 to hold one end of the optical coupling sleeve 120. A first stopper protrusion portion 133 that locks one end of the optical coupling sleeve 120 is protruded inward in a radial direction at the one end of the first holding portion 132 in a longitudinal direction.

A first flange portion 134 of a rectangular shape is provided on the outer circumference of the other end of the first holding portion 132 opposite to the first stopper protrusion portion 133.

At both short sides of the first flange portion 134, a pair of locking claws 135 are provided to interpose the first holding portion 132 therebetween and a pair of coupling claws 135 are provided to interpose the second holding portion 145 of the outer member 140 to be described below. In the front ends of the coupling claws 135, the pair of locking claws 135a is provided to face each other, respectively. The coupling claws 135 couple the optical connector plug 10 with the optical connector adapter 110 by coupling with the coupling recess portion 35 of the plug frame 30 of the optical connector plug 10. A pair of locking protrusion portions 137 is provided at an end of a short side of the first flange portion 134.

Meanwhile, the outer member 140 of the holding member 150 has a penetrating portion 141 that is a through-hole that holds the sleeve holder 130 therein. A groove portion 143 that is fitted with the end of the first flange portion 134 of the sleeve holder 130 is provided at both short sides of the penetrating portion 141. A second flange portion 144 contacting the first flange portion 134 and a second holding portion 145 having a cylindrical portion are provided at a side opposite to an insertion direction of the first flange portion 134 from an axial center portion within the penetrating portion 141. The second holding portion 145 extends in the axial direction from the second flange portion 144 and communicates with the first through-hole 131. In the second holding portion 145, a second through-hole 142 that holds the other end of the optical coupling sleeve 120 is provided. A second stopper protrusion portion 146 that locks the end of the optical coupling sleeve 120 protrudes inward in the radial direction at the end of the second holding portion 145.

Meanwhile, a fixation flange 148 is provided in the axial center portion of the outer circumferential surface at both short sides of the outer member 140. A fixation groove 148a to fix the housing 140 to a panel (not illustrated in the drawings) through screwing is provided in the fixation flange 148. A plate concave portion 149 is formed at the facing short sides of one side of the housing 140 in the axial direction and a surface between the facing short sides. A U-shaped plate 153 having a metal coupling claw 152 is fitted into the plate concave portion 149.

A sequence of when the optical connector adapter 110 according to this embodiment described above is assembled is as follows. The sleeve holder 130 is inserted in the outer member 140 with the optical coupling sleeve 120 inserted between the first and second holding portions 132 and 145, and a locking pin 151 is inserted into the outer member 140 such that an arm portion 151a is engaged with the locking protrusion portion 137 of the sleeve holder 130. Accordingly, the sleeve holder 130 is engaged with the outer member 140 and the optical coupling sleeve 120 is interposed between the sleeve holder 130 and the housing 140.

Figure 6:
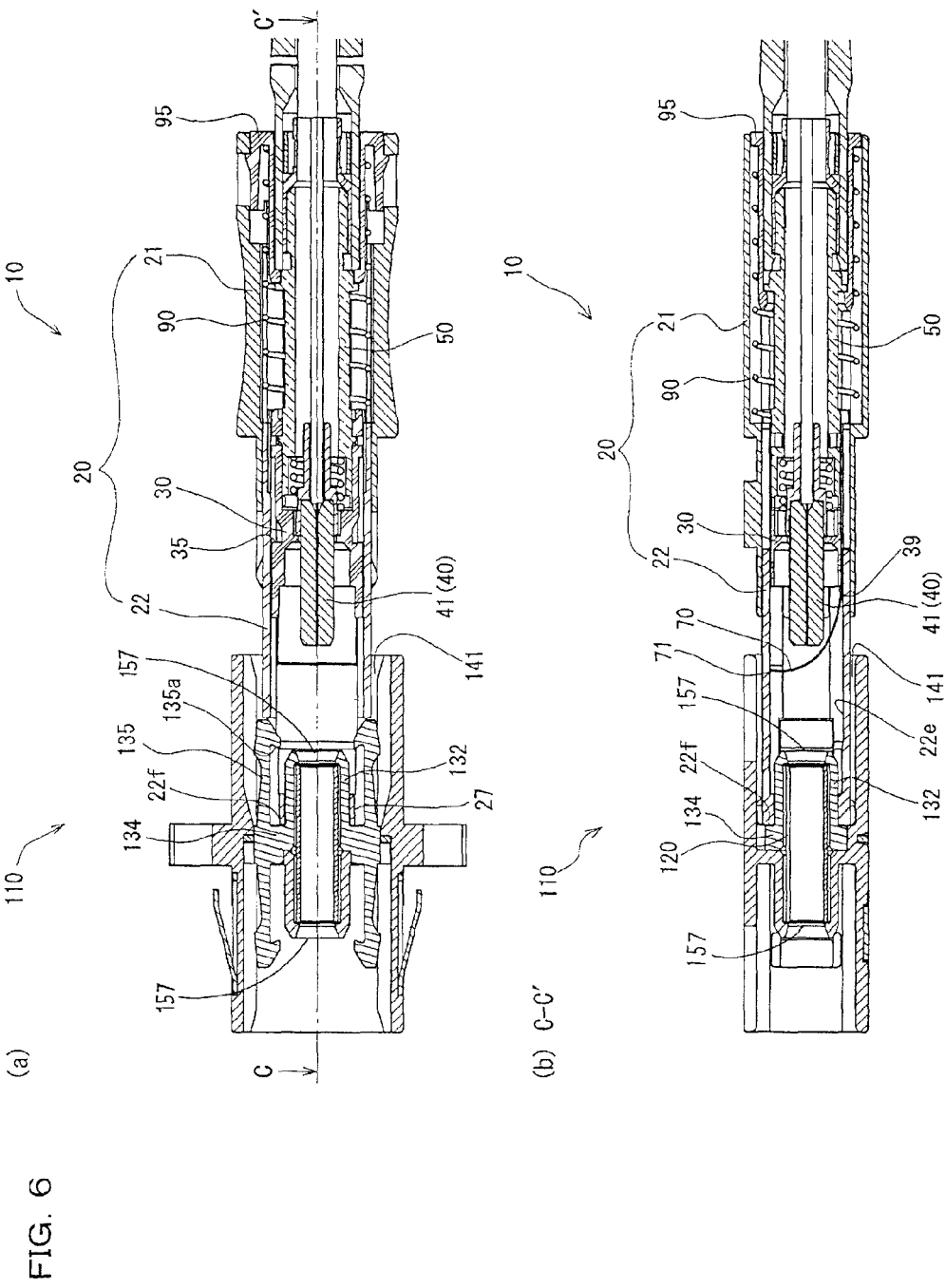
FIGS. 6A and 6B are cross-sectional views illustrating a coupling operation between the optical connector plug and the optical connector adapter according to the embodiment of the present invention.

Hereinafter, an operation of coupling the optical connector plug 10 to the optical connector adapter 110 will be described in detail. FIGS. 6A to 7B are cross-sectional views illustrating a coupling operation of the optical connector. FIG. 6B is a cross-sectional view taken along the line C-C' of FIG. 6A. FIG. 7B is a cross-sectional view taken along the line C-C' of FIG. 7A.

As illustrated in FIGS. 6A and 6B, the front end 157 of the holding portion 132 and the front end 71 of the shutter member 70 face in the axial direction, when the shutter holding member 22 is engaged with the holding portion 132 protruding in the axial direction of the optical connector adaptor 110, in the extension state of the housing 20. That is, the front end 72 of the shutter member 70 is fixed to the rear side of the axial direction of the shutter holding member 22 and the front end 71 of the shutter member 70 is positioned at the center of the axial direction of the shutter holding member 22. As illustrated in FIGS. 6A and 6B, the grip member 21 of the optical connector plug 10 is grasped and inserted into the penetrating portion 141 of the optical connector adapter 110 under a state in which the housing 20 extends and the front end of the ferrule 40 is shielded by the shutter member 70. At this time, the coupling claw 135 passes through a coupling claw passing portion 27, the shutter holding member 22 moves to the center portion of the optical connector adaptor 110 without contacting the coupling claw 135, and a front end face 22f of the shutter holding member 22 contacts the first flange portion 134.

If the optical connector plug 10 is inserted, at the same time as when the shutter holding member 22 presses and reduces the biasing member 90, a front end edge 39 of the plug frame 30 that is moved to the front end of the axial direction together with the grip member 21 lays the shutter member 70, and the shutter member 70 is accommodated in the accommodating portion 22e. That is, by only inserting the optical connector plug 10 into the optical connector adaptor 110, the housing 20 is reduced gradually from the extension state to the reduction state and the shutter member 70 is inclined and deformed from the shield position to the non-shield position. In the optical connector plug 10, in a course in which the shutter holding member 22 is engaged with the holding portions 132 and 145 protruding in the axial direction of the optical connector adaptor 110 and the grip member 21 moves from the extension state to the reduction state, the front end 71 of the shutter member 70 is spaced to face the front ends 157 of the holding portions 132 and 145 in the axial direction.

At the same time as when the state of the housing 20 changes gradually to the reduction state, the plug frame 30 moves to the center portion of the optical connector adaptor 110 while increasing the interval of the facing coupling claws 135, and the coupling recess portion 35 of the plug frame 30 is exposed to the outside by the first and second exposure holes 25 and 29 of the housing 20. At the same time, the ferrule 40 is inserted into the optical coupling sleeve 120.

As illustrated in FIGS. 7A, and 7B, the locking claw 135a of the optical connector adaptor 110 is coupled to the coupling recess portion 35 through the first and second exposure holes 25 and 29. Thereby, the optical connector plug 10 is coupled to the optical connector adaptor 110. Although not illustrated in the drawings, one optical connector plug 10 is connected from the other side of the optical connector adaptor 110 in the same way and the optical connector plugs 10 are optically coupled through the optical connector adaptor 110.

As such, by only inserting the optical connector plug 10 into the optical connector adaptor 110, the housing 20 becomes the reduction state and the shutter member 70 moves to the non-shield position. During a series of operations until the optical connector plugs 10 are inserted into the optical connector adaptor 110 and are connected, the ferrule 40 is not exposed to the outside of the housing 20. For this reason, communication light does not leak into the outside of the optical connector plug 10 and the optical connector plug 10 has high safety.

Meanwhile, if the grip member 21 of the optical connector plug 10 is grasped and drawn out of the optical connector adapter 110, the grip member 21 is retreated from the plug frame 30, the coupling claw 135 is pressed by the coupling releasing portion 25a, and the locking claw 135a of the coupling claw 135 is disengaged from the coupling recess portion 35. Thereby, the plug frame 30 is retreated. At the same time, the shutter holding member 22 is pressed to the front side by the biasing member 90 and the housing 20 extends gradually from the reduction state to the extension state.

Thereby, the shutter member 70 that is accommodated in the accommodating portion 22c by the plug frame 30 begins to be inclined and deformed toward the shield position. The optical connector plug 10 is detached from the optical connector adaptor 110, the housing 20 becomes the extension state, the shutter member 70 is inclined and deformed to the shield position, and the front end 71 of the shutter member 70 contacts the inner surface of the insertion hole 22a. As a result, the shutter member 70 is positioned at the shield position and shields the front end face of the ferrule 40.

In cooperation with the operation of inserting the optical connector plug 10 according to this embodiment into the optical connector adaptor 110 and the operation of drawing the optical connector plug 10 from the optical connector adaptor 110, the front end 71 of the shutter member 70 moves to the shield position and the non-shield position. Therefore, connection with the optical connector adaptor 110 is easy.

In a state in which the front end 71 of the shutter member 70 moves between the shield position and the non-shield position, the shutter member 70 does not interfere (contact and collide) with the optical connector adaptor 110. Therefore, the shutter member 70 is not deformed and damaged. For this reason, even when the elastic force of the coupling claw 135 of the optical connector adaptor 110 becomes weak, when the interval of the coupling claws 135 is larger than the standard interval, and the shutter holding member 22 of the optical connector plug 10 is erroneously inserted into the optical connector adaptor 110, the optical connector 10 can be inserted and drawn.

Even when the optical connector plug 10 is inserted into a portion not having a shape corresponding to the coupling claw 135 of the optical connector adaptor 110 like when the optical connector plug 10 is connected to a measurer such as an optical power measurer and a ferrule end face shape measurer or is inserted into a ferrule end face cleaning tool, the shutter member 70 can be attached/detached without a damage and convenience can be raised.

Even in a state in which the optical connector plug 10 is not connected to the optical connector adaptor 110, the biasing member 90 (coil spring) biases the housing 20 in the extension state at all times. Therefore, the shutter member 70 can be prevented from becoming the reduction state erroneously and moving to the non-shield position and safety can be raised.

In the optical connector plug 10, by providing the biasing member receiving member 95, the difficulty of assembling the optical connector plug can be removed, the biasing member 90 (coil spring) and the biasing member receiving member 95 can be disposed on the outer circumference of the caulking ring 57, and the entire length of the optical connector plug 10 can be reduced.

REFERENCE SIGNS LIST

10: optical connector plug
15: optical fiber
20: housing
21: grip member
22: shutter holding member
30: plug frame
35: coupling recess portion
40: ferrule
41: ferrule barrel-shaped body
50: stop ring
57: caulking ring
58: ring
59: boot
60: spring
70: shutter member
71: front end
72: base end
90: biasing member
95: biasing member receiving member
110: optical connector adaptor
120: optical coupling sleeve
130: sleeve holder
135: coupling claw
140: outer member
150: holding member
151: locking pin
153: plate
154: first biasing member supporting portion
155: second biasing member supporting portion
157: front end

What is claimed is:

1. An optical connector plug of a push-on coupling system, which is coupled to an SC- type optical connector adaptor, complying with IEC 61754-4, having
   (1) an optical coupling sleeve,
   (2) a holding member, and
   (3) a flange portion provided on the outer circumference of an end of the holding portion , wherein
   the holding member includes a holding portion to hold one end of an optical coupling sleeve protruding in an axial direction and a pair of coupling claws to couple the optical connector plug by coupling with a coupling recess portion of the optical connector plug, the optical connector plug comprising:
   (a) a plug frame that holds a ferrule having at least one optical fiber extending in an axial direction; and
   (b) a housing that holds the plug frame therein,
   wherein the housing includes a grip member and a shutter holding member that move relatively in the axial direction,
   the shutter holding member includes a shutter member that has a front end positioned at a front side in the axial direction and a base end positioned at a rear side in the axial direction and held in the shutter holding member, the plug frame moves relatively in the axial direction with respect to the shutter holding member while synchronizing with the grip member in a state in which a predetermined movement amount in the axial direction is allowed, having an extension state in which the grip member moves to the rear side of the axial direction of the shutter holding member and a reduction state in which the grip member moves to the front side of the axial direction of the shutter holding member,
   the housing has a shape to be coupled to the optical connector adaptor in the reduction state, and a coupling recess portion provided on the outer circumference of a front end side of the plug frame to receive therein the coupling claw of the optical connector adaptor,
   characterized in that,
   after the front end of the shutter holding member is inserted toward the holding portion protruding in an axial direction of the optical connector adaptor, the front end of the shutter holding member passes through the coupling claw of the optical connector adaptor, moves to a center of the optical connector adaptor and then contacts the flange portion,
   and then, the front end of the shutter member moves from a shield position to shield a front end face of the ferrule in the extension state to a non-shield position to expose the front end face of the ferrule to a front side of the housing in the reduction state, and movement of the front end of the shutter member into the non-shield position does not contact the holding portion.

2. The optical connector plug according to claim 1, wherein, in the shutter member, the base end is held at a rear side of the axial direction of the shutter holding member and the front end is positioned at a center of the axial direction of the shutter holding member.

3. The optical connector plug according to claim 2,
wherein the front end of the shutter member is positioned to be closer to the rear side of the axial direction of the shutter holding member than the coupling recess portion of the plug frame, in the reduction state.

4. The optical connector plug according to claim 1,
wherein the shutter member is formed of a plate spring.

5. The optical connector plug according to claim 1,
wherein the shutter holding member is provided with a shutter biasing member to bias the shutter member and to dispose the front end of the shutter member at the shield position in the extension state.

6. A push-on coupling system comprising the optical connector plug according to claim 1 and an optical connector adaptor;
wherein the optical connector adaptor complies with IEC 61754-4 and comprises of:
(a) an optical coupling sleeve,
(b) a holding member including, a holding portion to hold one end of an optical coupling sleeve protruding in an axial direction,
(c) a flange portion provided on the outer circumference of an end of the holding portion, and
(d) a pair of coupling claws to couple the optical connector plug by coupling with a coupling recess portion of the optical connector plug,
characterized in that,
when the shutter holding member is inserted toward a holding portion protruding in an axial direction of the optical connector adaptor, the insertion causing the front end of the shutter holding member to pass through the coupling claw of the optical connector adaptor and to move to a center of the optical connector adaptor and then to contact the flange portion, the front end of the shutter member is spaced to the rear side in the axial direction from both the front end of the shutter member and the holding portion of the optical connector adaptor.

7. The push-on coupling system according to claim 6,
wherein, in the shutter member, the base end is held at a rear side of the axial direction of the shutter holding member and the front end is positioned at a center of the axial direction of the shutter holding member.

8. The push-on coupling system according to claim 7,
wherein the front end of the shutter member is positioned to be closer to the rear side of the axial direction of the shutter holding member than the coupling recess portion of the plug frame, in the reduction state.

9. The push-on coupling system according to claim 6,
wherein the shutter member is formed of a plate spring.

10. The push-on coupling system according to claim 6,
wherein the shutter holding member is provided with a shutter biasing member to bias the shutter member and to dispose the front end of the shutter member at the shield position in the extension state.

* * * * *